Dec. 9, 1930. C. P. WETMORE 1,783,989
REVERSIBLE CHUCK FOR LATHES
Filed Dec. 29, 1924 2 Sheets-Sheet 1

WITNESS:
Fred Pahm

INVENTOR.
C. P. WETMORE,
BY
Erwin, Wheeler & Woolard
ATTORNEYS.

Dec. 9, 1930.  C. P. WETMORE  1,783,989
REVERSIBLE CHUCK FOR LATHES
Filed Dec. 29, 1924   2 Sheets-Sheet 2
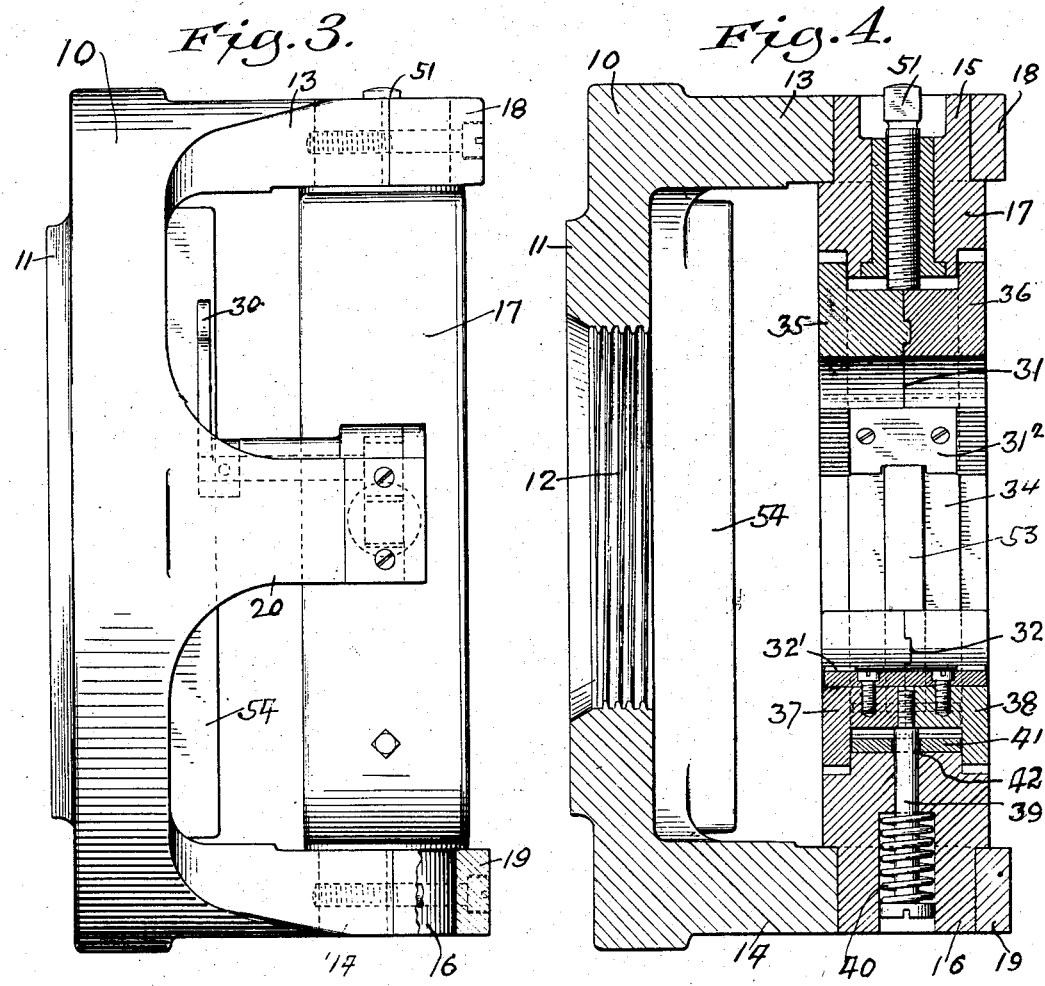
INVENTOR.
C. P. WETMORE,
BY
ATTORNEYS.

Patented Dec. 9, 1930

1,783,989

UNITED STATES PATENT OFFICE

CHARLES P. WETMORE, OF MILWAUKEE, WISCONSIN, ASSIGNOR TO A. O. SMITH CORPORATION, OF MILWAUKEE, WISCONSIN, A CORPORATION OF NEW YORK

REVERSIBLE CHUCK FOR LATHES

Application filed December 29, 1924. Serial No. 758,610.

My invention relates to lathe chucks, and resides in a reversible chuck primarily designed for clamping and holding pipe couplings of large diameter, so that when the coupling blank is once chucked it is maintained in the exact position necessary to enable the several successive finishing operations to be performed accurately and with precision in order to bring the coupling into a state of completion.

Pipe couplings of the character described are provided, before threading, with a bore which tapers from each end of the coupling to the middle thereof, so as to produce at the line of the latter a constriction of the bore. It is advantageous for several reasons that the threads cut in the tapering bore be continuous from one end of the coupling to the other, and that such threads cross the constriction at the middle of the coupling without a perceptible joining line, so that the threads cut in one end of the coupling will merge accurately into the threads cut in the other end.

The reversible chuck constituting the present invention is mounted, in the preferred arrangement, upon the lathe head, and the several tools such as taper borers, thread chasers, counter-borers and end finishers, are carried by heads upon a turret positioned on the lathe bed, so as to be brought into position for operation as desired.

The lead screw usual in lathes imparts to the turret a predetermined feeding movement, and although the value of such movement in the boring operations is negligible, it possesses the greatest value in the threading operations, inasmuch as a definite relation is established between the movement of rotation of the coupling blank and the forward feeding movement of the threading head into the bore of the blank. This relation once being established in the operation of chucking the coupling blank, it follows that such relation is not changed when, at the conclusion of the threading operation in one end of the coupling, the chuck is turned on its fixed radial centers to reverse the coupling blank and position the other end thereof for operation by the tooling heads. Accordingly, the threads cut in the second operation will merge exactly into those cut in the first operation, with a clear definition of the threads throughout the bore of the coupling.

The features of construction residing in my invention will now be described, and the novelty thereof will be pointed out in the appended claims.

In the accompanying drawings:

Fig. 3 is side elevation of the chuck, looking from the left of Fig. 1.

Fig. 4 is a vertical sectional view on the line 4—4, Fig. 1, the coupling blank not being shown.

Fig. 5 is a transverse sectional view on the line 5—5, Fig. 1, through the reversible member constituting the clamping element of the chuck, the coupling blank not being shown.

Figure 1:
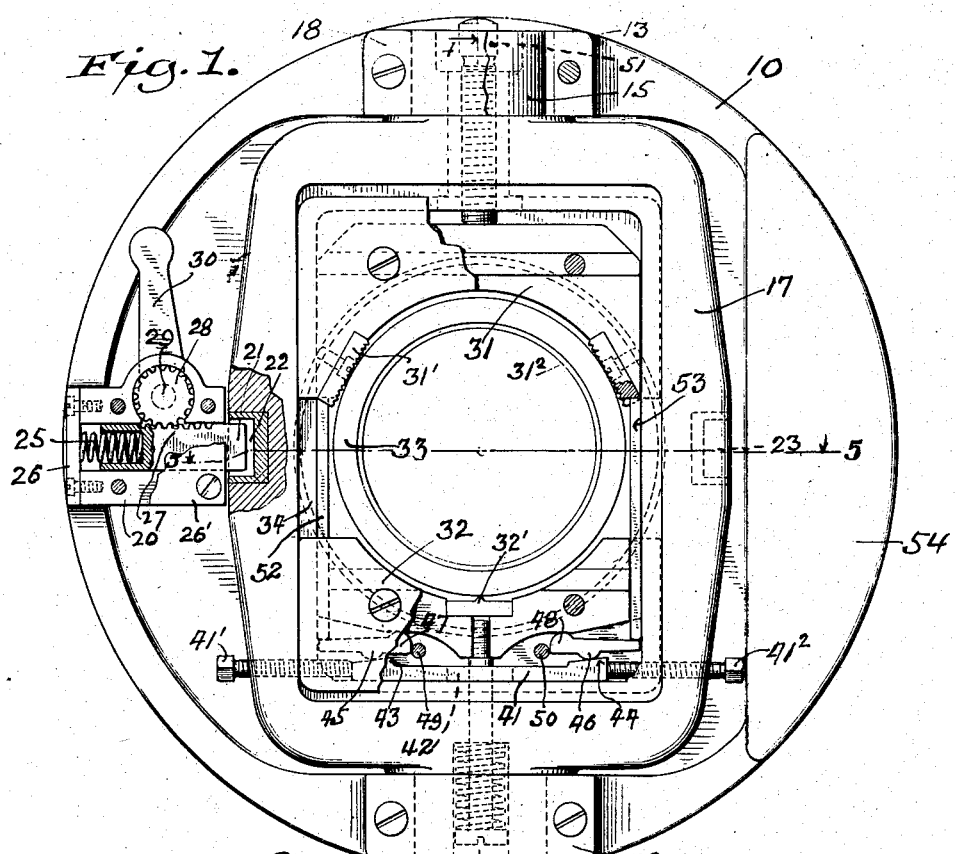
Figure 1 is a view in front elevation of my improved chuck with a coupling blank in position, some of the parts being broken out and others sectioned to show the construction and arrangement of the elements.

In the drawings, the numeral 10 indicates a ring-like balanced head, the web 11 at the rear side of which is provided with a threaded opening 12, by means of which the chuck embracing the head 10 as an element may be connected to the spindle of a lathe.

The ring-like head 10 is provided on its front face with diametrially disposed parallel projections 13 and 14, in which are formed bearings for the journals 15 and 16 of the reversible chucking member 17, such bearings being completed by caps 18 and 19, which are attached to the said projections.

The chucking member is formed substantially as a rectangular frame 17 of such proportions as to be evenly balanced, and the radially arranged journals thereon have their bearings at such distance from the web 11 of the head, that the frame 17 is supported in a position which will permit the said frame to be freely turned in its bearings without interference by the head.

Figure 2:
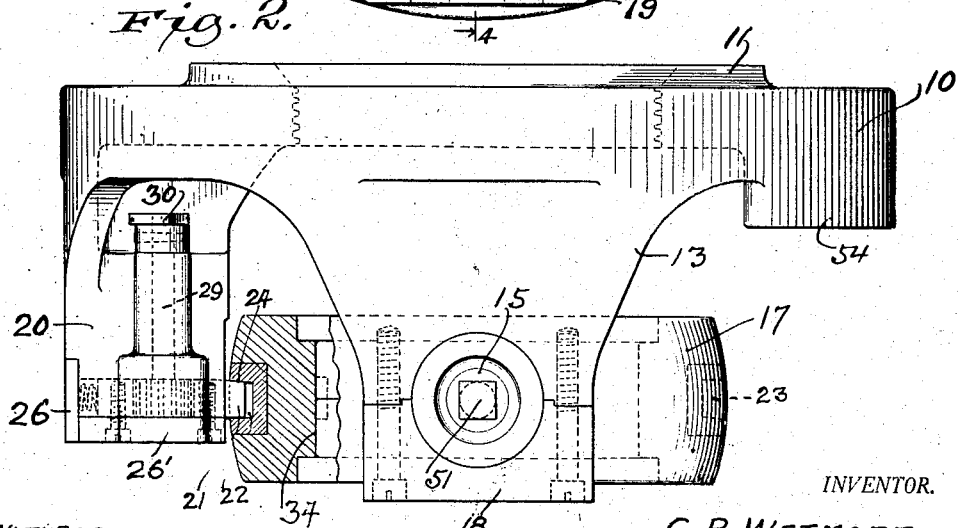
Fig. 2 is a plan view of the chuck, some parts likewise being broken out and others sectioned.

On the face of the head 10, is a third parallel projection 20, spaced between the projections 13 and 14, the said projection 20 supporting the devices which are employed for locking and retaining the chucking member 17 in either of its operative positions, that is, always with the said member standing in a transverse plane which is perpendicular to the axis of the clutch, and with the opening through such member aligned with such axis. Such locking and retaining means comprises a radially movable bolt 21, sliding in a socket in the projection 20, and adapted at its inner end to enter either of the recesses 22 and 23, formed oppositely in the outer sides of the chucking member 17, and align the opening in the same accurately with relation to the axis of the lathe spindle. The said recesses are preferably bushed with wear-resisting material, and the bolt 21 is hardened, for the purpose of avoiding any variation in such alignment. Exact positioning of the chucking member in its operative plane is secured by tapering one side of the end of the bolt 21, as at 24, and forming the recesses to correspond, as indicated in Fig. 2.

An expansion spring 25, confined in the socket or channel in the projection 20 by cover plates 26 and 26', bears against the rear end of the bolt 21 and normally effects the engagement of the bolt in one or the other of the recesses 22 and 23. One side of the bolt is provided with a rack 27, the teeth of which are engaged by a pinion 28, on one end of a shaft 29, journaled in the projection 20, the shaft being provided at its other end with a radial arm 30, by means of which the pinion may be rotated to withdraw the bolt 21, against the opposition of the spring 25, and thus release the clamping member 17, for a turning movement of 180° in its radially disposed bearings. Upon completion of such turning movement, the bolt 21 is actuated by the spring 25, to lock the parts in exact operative position. Centrifugal force acting upon the lever 30 insures such locking during rotation of the chuck.

An upper chucking jaw 31 and a lower chucking jaw 32, are disposed at the ends of the elongated opening in the member 17, such jaws receiving between them the coupling blank 33, as shown in Fig. 1. I prefer to engage the exterior surface of the coupling blank at three points to insure accurate centering in the chuck, two of such points $31^1$ and $31^2$ being carried by the upper jaw 31, and one, indicated $32^1$, by the lower jaw 32. The points of engagement, in this arrangement, should be approximately 120° apart.

The jaws 31 and 32 are guided for a sliding movement toward and from each other in the frame 17, which latter is provided with a tongue 34, formed by reducing the thickness of the frame 17 at both sides adjacent the elongated opening therein, to form a guide for the jaws. The latter are each formed of two parts, which when assembled form at the sides of the jaw a groove which receives the tongue 34, and guides the jaws in their radial or inward and outward movements.

The two parts 35 and 36 of the upper jaw 31 are secured in assembled position by means of screws counter-sunk into one part and threaded into the other. In like manner, the parts 37 and 38 of the lower jaw are secured together by other screws.

The lower journal 16 of the chucking frame 17 is bored centrally for the accommodation of a screw 39, the end of which is threaded into the lower jaw 32, and an expansion spring 40, confined by the head of the screw in an enlargement of the central bore, acts normally to withdraw the jaw 32 from its position of engagement with the coupling blank.

A cam slide 41 is arranged in the channel at the underside of jaw 32, and is adjusted and held in its longitudinal position upon the rib at the lower side of the opening in the chucking frame 17, by means of set screws $41^1$ and $41^2$ passed through threaded openings in the adjacent sides of the frame, as shown in Fig. 1. A slot 42 in the said slide will permit its movement without interference by the screw 39 which passes through the slot.

The face of the slide 41 is provided with two projections 43 and 44, upon the inclined surfaces of which rest the heels 45 and 46 of floating levers 47 and 48, also mounted in the channel at the underside of the jaw 32. The floating levers abut at one end against the tongue 34, and their longitudinal movement is further restrained by pins 49 and 50, set transversely in the parts 37 and 38 of the lower jaw 32.

The journal 15 of the chucking frame is bored centrally for the reception of a set screw 51, the point of which bears upon the upper side of the jaw 31, and slide bars 52 and 53 extend between the lower depending corners of the jaw 31 and the outer ends of the floating levers 47 and 48, so that when pressure is applied to the upper jaw by means of the set screw 51, the motion is transmitted reversely to the lower jaw, so that the two jaws are caused to approach and clamp the coupling blank between them. The lower jaw 32 is provided with a second groove within the larger groove at both sides for the accommodation of the slide bars 52 and 53.

The weight of the projection 20 and the parts carried thereby, is offset by the provision of a counter-balance 54, upon the head 10, so that the whole chuck may rotate in a state of balance. In fact, all of the parts of the chuck are proportioned and the weight distributed so as to preserve such balance.

In operation, the jaws 31 and 32 are separated through the retraction of the set screw 51 and the expansive action of the spring 40, and a coupling blank 33 is positioned between the jaws 31 and 32 of the chuck, the reversible member 17 of the chuck being locked by the bolt 21. The set screw 51 is then rotated forwardly, and the chucking jaws are caused to engage the periphery of the coupling at several points, as stated, the motion of the upper jaw being transmitted to the lower jaw through the slide bars 52 and 53 and the floating levers 47 and 48. The chuck with the coupling tightly clamped therein is put in rotation, and the turret with the boring tool in line is advanced into the outer end of the coupling to taper bore out the latter to the desired size. The boring head is then withdrawn, the turret turned, and the head with the thread chasers advanced to the coupling in the second forward movement of the turret. The speed of the lathe is reduced in the threading operation, and at the conclusion of the latter, the threading head is withdrawn. I have found it convenient to associate the counter-boring and end finishing tools with the thread chasers, so that one end of the coupling is completely finished in the two operations of the turret.

The bolt 21 is withdrawn through movement of the radial arm 30, and the chucking member 17, still holding the coupling blank, is free to be rotated through 180° on its radially disposed journals, so as to face outwardly the other end of the coupling blank, the second position of the coupling blank being effected through the locking bolt 21. The other end of the coupling is then subjected to the successive operations of boring and threading and end finishing, as before described, and at the conclusion of these operations, the finished coupling may be removed from the chuck by simply releasing the pressure of the set screw 51.

By means of my present invention, I am enabled to form in pipe couplings having bores which taper from each end to the central constriction thereof, threads of uniform pitch and depth, and which are continuous from one end of the coupling to the other, by a single chucking operation. Through the lead screw of the lathe, the rotation of the chuck and the feeding movement of the threading head are so related and synchronized that the threads cut in the last operation merge invariably into those cut in the first operation without a demarking line at the point where the threads actually meet. This result cannot be attained where the coupling blank is chucked for each end treatment, by reason of the impossibility of bringing the threads into register at their merging line.

The features of construction which permit accurate adjustment and synchronous movement of the chucking jaws into position so that the center line of the coupling blank is invariably aligned with that of the lathe spindle are important. The circular plane in which the peripheral surface of the coupling blank is rotated is thus fixed, and the inequalities in the blank, if any, are thrown to the center thereof to be cut away in the action of the boring tools, and produce a coupling the walls of which are of uniform gauge. In determining the relations of the reversible chucking member to the head, it is equally important in journalling the chucking member in the head that the transverse axial line of the chucking member bisect the longitudinal axial line of the head and the spindle of the lathe upon which it is carried. It follows that when alignment is once effected in the chucking of the coupling blank, such alignment is not varied in either of the respective positions of the chuck. Hence, absolute accuracy in the work is attained through the means embodied in my invention.

Having thus described my invention, what I claim and desire to secure by Letters Patent of the United States, is:

1. In a reversible chuck, a head for connection to the spindle of a lathe, a reversible chucking member provided with journals which are mounted radially with respect to the said head, means for locking the chucking member in either operative position, chucking jaws one actuated from the other carried by the said member, and means in part located in a journal of the said member for actuating the jaws simultaneously.

2. In a reversible chuck, a head for connection to the spindle of a lathe, a reversible chucking member provided with journals which are mounted radially with respect to the said head, means for locking the chucking member in either operative position, oppositely movable chucking jaws one actuated from the other carried by the said member, and means in part located in a journal of the said member for actuating the jaws simultaneously.

3. In a reversible chuck, a head for connection to the spindle of a lathe, a reversible chucking member provided with journals which are mounted radially with respect to the said head, means carried by the head for locking the chucking member in either operative position, oppositely movable chucking jaws one actuated from the other carried by the said member, and means in part located in a journal of the said member for actuating the jaws simultaneously.

4. In a reversible chuck, a head for connection to the spindle of a lathe, a reversible chucking member mounted in the said head for rotation upon an axis bisecting the axis of the head, means for locking the chucking member in either operative position, oppositely moving chucking jaws mounted to slide in the said member, means located in one of the journals of the chucking member for moving one of such jaws and connections independent of such means for transmitting such motion to the other jaw to effect a simultaneous engagement of both jaws with the work.

5. In a lathe chuck, a head for connection to the spindle of a lathe, a chucking member carried thereby, oppositely moving jaws mounted to slide in the said member, means for moving one of such jaws, and means comprising rocking levers actuated in the movement of the first jaw for simultaneously moving the other jaw.

6. In a lathe chuck, a head for connection to a lathe spindle, a chucking member mounted in the said head, a pair of oppositely movable jaws slidably mounted in the said member, pressure means for moving one of the jaws, and means comprising slide bars and rocking levers intermediate the jaws for transmitting the movement of the first jaw to the second jaw.

7. In a lathe chuck, a head for connection to a lathe spindle, a chucking member mounted in the head, a pair of oppositely movable jaws mounted in the said member, means for moving one of the jaws, means including rocking levers for transmitting such movement to the other jaw, and means for adjusting the position of the said levers in the chucking member.

8. In a reversible chuck for lathes, a head for connection to the spindle of a lathe, a chucking member journaled on the said head for rotation on an axis transverse to that of the said head and spindle, means carried by the head for locking the chucking member in position upon the said head, and devices operating centrifugally to maintain the locking engagement of the chucking member in relation to the head.

9. In a reversible chuck for lathes, a head for connection to the spindle of a lathe, a chucking member journaled on the said head for rotation on an axis transverse to that of the said head and spindle, means carried by the head for locking the chucking member in position upon the said head, devices operating centrifugally to maintain the locking engagement of the chucking member in relation to the head, and a counter-balance for the said locking means and devices.

10. In a chuck for lathes, a head for connection to the spindle of a lathe, a reversible chucking member carrying chucking jaws journaled in the said head for rotation on an axis transverse to that of the chucking member and lathe spindle, the said chucking member being provided with peripheral recesses, a sliding bolt on the head for engagement with one or the other of the said recesses to lock the chucking member in either position on the head, and devices operating centrifugally to maintain the locking engagement of the bolt with the chucking member.

11. In a chuck for lathes, a head for connection to the spindle of a lathe, a reversible chucking member carrying chucking jaws journaled in the said head for rotation on an axis transverse to that of the chucking member and lathe spindle, the said chucking member being provided with peripheral recesses, a sliding bolt on the head for engagement with one or the other of the said recesses to lock the chucking member in either position on the head, devices operating centrifugally to maintain the locking engagement of the bolt with the chucking member, and a counter-balance for the said locking means and devices.

In testimony whereof, I have signed my name at Milwaukee, this 27th day of December, 1924.

CHARLES P. WETMORE.